US008271686B2

(12) United States Patent
Jouppi et al.

(10) Patent No.: US 8,271,686 B2
(45) Date of Patent: Sep. 18, 2012

(54) TRANSMISSION OF PACKET DATA TO A WIRELESS TERMINAL

(75) Inventors: Jarkko Jouppi, Tampere (FI); Juha Wiljakka, Riitiala (FI); Janne Rinne, Tampere (FI); Lassi Hippeläinen, Helsinki (FI); Tuija Hurtta, Espoo (FI); Serge Haumont, Helsinki (FI)

(73) Assignee: Intellectual Ventures I LLC, Wilmington, DE (US)

( * ) Notice: Subject to any disclaimer, the term of this patent is extended or adjusted under 35 U.S.C. 154(b) by 1942 days.

(21) Appl. No.: 10/365,916

(22) Filed: Feb. 12, 2003

(65) Prior Publication Data

US 2003/0221016 A1 Nov. 27, 2003

(30) Foreign Application Priority Data

Feb. 13, 2002 (FI) .................................. 20020293
Feb. 13, 2002 (FI) .................................. 20020294

(51) Int. Cl.
*G06F 15/16* (2006.01)
*H04L 12/28* (2006.01)
(52) U.S. Cl. .................... 709/246; 709/227; 370/329
(58) Field of Classification Search .............. 709/245
See application file for complete search history.

(56) References Cited

U.S. PATENT DOCUMENTS

| 6,229,806 | B1 * | 5/2001 | Lockhart et al. ............. 370/389 |
| 6,847,610 | B1 * | 1/2005 | Suumaki et al. .......... 370/230.1 |
| 6,954,790 | B2 * | 10/2005 | Forslow ..................... 709/227 |
| 6,959,009 | B2 * | 10/2005 | Asokan et al. ............... 370/475 |
| 7,010,303 | B2 * | 3/2006 | Lewis et al. ................. 455/445 |
| 7,298,697 | B2 * | 11/2007 | Hurtta ......................... 370/230 |
| 7,324,498 | B2 * | 1/2008 | Ahn et al. .................. 370/349 |
| 2001/0017856 | A1 * | 8/2001 | Asokan et al. .............. 370/389 |
| 2001/0027490 | A1 * | 10/2001 | Fodor et al. ................. 709/238 |
| 2002/0016855 | A1 * | 2/2002 | Garrett et al. ............... 709/238 |
| 2002/0032800 | A1 * | 3/2002 | Puuskari et al. ............ 709/246 |
| 2002/0062379 | A1 * | 5/2002 | Widegren et al. ........... 709/227 |
| 2002/0069278 | A1 * | 6/2002 | Forslow ...................... 709/225 |
| 2002/0133607 | A1 | 9/2002 | Nikander |
| 2003/0026230 | A1 * | 2/2003 | Ibanez et al. ............... 370/338 |

(Continued)

FOREIGN PATENT DOCUMENTS

EP 1 154 664 A1 11/2001

(Continued)

OTHER PUBLICATIONS

U.S. Appl. No. 60/294,575, filed Jun. 2001, Krishnarajah et al.*

(Continued)

Primary Examiner — Peling Shaw
Assistant Examiner — Joiya M Cloud (57) ABSTRACT

The invention relates to a method of transmitting packet data from a first subsystem to a wireless terminal device via the network node of a second subsystem. In the method, at least one filter is formed to guide mapping of at least one data flow of the first subsystem to at least one data flow of the second subsystem. At least one filter is attached to at least one data flow of the second subsystem. The filter comprises at least part of the interface identifier of the IP address, which at least part of the interface identifier is allocated in the wireless terminal device. Hereby, mapping of the data flow of the first subsystem to the data flow of the second subsystem is performed on the basis of the interface identifiers of the destination IP addresses in the received packets.

6 Claims, 4 Drawing Sheets

U.S. PATENT DOCUMENTS

| | | | |
|---|---|---|---|
| 2003/0081578 A1 * | 5/2003 | White et al. | 370/338 |
| 2003/0081592 A1 * | 5/2003 | Krishnarajah et al. | 370/352 |
| 2003/0157926 A1 * | 8/2003 | Ala-Laurila et al. | 455/406 |

FOREIGN PATENT DOCUMENTS

| | | |
|---|---|---|
| WO | WO 00/41401 | 7/2000 |
| WO | WO 01/17291 | 3/2001 |
| WO | WO 01/54437 | 7/2001 |
| WO | WO 01/56250 | 8/2001 |
| WO | WO 01/76297 A1 * 10/2001 | 455/406 |

OTHER PUBLICATIONS

"General Packet Radio Service (GPRS): Service Description; Stage 2; Release 5", Jan. 2002, Ch. 9, pp. 119-140.

* cited by examiner

TRANSMISSION OF PACKET DATA TO A WIRELESS TERMINAL

BACKGROUND OF THE INVENTION

The invention relates to transmission of packet-switched data to a wireless terminal, particularly when using addresses according to the IPv6 (version 6 of the IP protocol).

GPRS services (General Packet Radio Service) and packet-switched services of the UMTS system (Universal Mobile Telecommunications System) utilize PDP (Packet Data Protocol) contexts in transmitting user data. PDP contexts are generally logical connections with which the IP data is transmitted from a mobile station to the gateway GPRS support node (GGSN) of the UMTS network, and vice versa. The mobile station is allocated (at least one) PDP address, for which several PDP contexts can be opened in the system. The first context is called a primary PDP context, the following PDP contexts being secondary PDP contexts.

The mobile station knows which application data flows are to be directed into which PDP context tunnel in the transmission of uplink data. In the direction of the downlink, the gateway GPRS support node GGSN must also know packet-specifically which PDP context is used for which data flow received from an external IP network. For this purpose, the destination IP address of the packet is used, and also TFT (Traffic Flow Template) templates are defined for the UMTS. The idea of TFT templates is that the mobile station transmits given values of TCP/UDP/IP address fields to the gateway GPRS support node GGSN for the identification of the flow. The TFT contains one or more so called packet filters. These packet filters allow particularly the arrangement of QoS mapping, i.e. the mapping of packets to the data flow in the UMTS system providing quality of service according to the QoS information of the received packets, e.g. the DiffServ (Differentiated Services) field.

In the UMTS system, it is possible to define the PDP address to be used for the mobile station dynamically or to use a fixed address. Due to the restricted number of IPv4 addresses, the IPv6 is important in the design of the UMTS system. In the UMTS system, the allocation of IPv6 addresses can be implemented using an IPv6 stateless address autoconfiguration mechanism or an IPv6 stateful address autoconfiguration mechanism. The IPv6 addresses are formed of a prefix containing 64 bits and a suffix containing 64 bits. The suffix comprises an interface identifier. It has been suggested for the UMTS system that in order to support the autoconfiguration mechanism of a stateless IPv6 address, a globally unique prefix be allocated to the primary PDP context, in which case the GGSN would use this prefix when transmitting packets from external networks to mobile stations of the UMTS network. This means that all packets having a prefix allocated to a certain mobile station as the destination IP address are transmitted to the mobile station. The GGSN also provides mobile stations with a suffix, which, however, the mobile stations do not have to use. Thus, the mobile stations can determine the suffix used on their own. This, however, involves a security risk, because attackers can transmit packets by using random interface identifiers. Since 64 bits are reserved for a suffix (there being $2^{64}$ addresses), detecting the attack automatically is virtually impossible. These packets load radio resources, and typically the receiver must also pay for all data he receives. Publication WO 00/41401 discloses a solution according to which the GGSN of the GPRS system can select the PDP context used on the basis of the IP address of the mobile station. The same principle has been in use also in previous 3GPP specifications, according to which the GGSN would determine the right PDP context by using the whole IP address allocated to the mobile station, in which case said problem cannot even have occurred. Thus, however, the solution disclosed in WO 00/41401 does not solve the problem, because the GGSN according to a new suggestion uses only an IPv6 prefix to direct packets to the mobile station, and the mobile station can thus change the interface identifier of its IP address any time. The gateway GPRS support node GGSN involves not only the checking of the prefix but also possible TFT templates, but only one of the secondary PDP contexts can be selected with them to be used as the transmission link for a packet when the filter conditions are met. Thus, the problem is not eliminated by means of TFT template filters, but all packets comprising a prefix allocated to the mobile station are further transmitted to the mobile station.

BRIEF DESCRIPTION OF THE INVENTION

An object of the invention is thus to provide a method and an apparatus implementing the method in such a way that the security risk could be avoided. The objects of the invention are achieved with a method, a telecommunication system, a network element and a wireless terminal device characterized in what is stated in the independent claims. Preferred embodiments of the invention are disclosed in the dependent claims.

The invention is based on the idea that at least part of the interface identifier allocated by the terminal is used as a filter to guide mapping of data flows from a first subsystem to the terminal of a second subsystem. When the terminal allocates a new interface identifier, the network node attending to data transmission between the first subsystem and the second subsystem is first informed. Hereby, only transmission of packets comprising an interface identifier determined as a filter can be allowed, using a data flow to which the filter condition is associated. Thus, transmission of packets using random interface identifiers can be prevented also in such implementations where the terminal can change the interface identifier. The interface identifier determined by the terminal refers to a bit sequence which reserves at least part of the bits determined for the interface identifier in the IPv6 address structure. The packets fulfilling the conditions generally determined by the filter are transmitted by utilizing the associated data flow, in the UMTS (and GSM) system by utilizing the PDP context allocated to a wireless terminal. The filter functionality can be implemented by using not only an interface identifier but also other predetermined parameters and/or conditions with which the packets or data flows can be identified.

According to a preferred embodiment of the invention, the interface identifier is a filter parameter of a TFT template used in the UMTS system. In such a case, the wireless terminal can activate the PDF context by using the interface identifier it has allocated. Since the wireless terminal in the GGSN network element operating as the edge node of the UMTS system is identified with the prefix of the IPv6 address when using IPv6 addresses, no prefix needs to be transferred in this case in messages relating to the activation of secondary PDP contexts, whereby the amount of information to be transmitted is smaller. The GGSN does not have to maintain prefixes for secondary PDP contexts either, nor does it have to check them, but the PDP contexts can be uniquely distinguished from each other on the basis of the interface identifier.

According to a second preferred embodiment of the invention, a wireless terminal can allocate a new interface identifier for a new application data flow, determine the QoS parameters according to the quality of service required by the application flow and establish a new PDP context on the basis of the interface identifier and the QoS parameters for these packets. After this, the gateway GPRS support node (GGSN) is capable of automatically connecting the packets incoming from an external network to the PDP context providing correct quality of service, and of rejecting the packets of whose interface identifiers it has not been informed.

According to yet another preferred embodiment of the invention, the interface identifiers of the source IP addresses of the packets to be transmitted are observed in a wireless terminal, and a list is maintained on the interface identifiers having been sent to the network node. When an interface identifier that is not on the list is detected, it is transmitted to the network node. In the network node, a filter is formed of the received interface identifier. This allows maintaining one list by means of which the allowed interface identifiers can be determined for example for all PDP contexts allocated to a mobile station.

BRIEF DESCRIPTION OF THE DRAWINGS

The invention will now be described in more detail in connection with preferred embodiments, with reference to the attached drawings, of which FIG. 1 generally illustrates a UMTS system.

DETAILED DESCRIPTION OF THE INVENTION

A method according to a preferred embodiment of the invention is described in the following in connection with an exemplary UMTS system and transmission of IPv6 packets. The invention can, however, be applied to any packet-switched telecommunication system. For example, the method according to the invention can well be applied to wireless local area networks, Bluetooth systems, fourth-generation systems succeeding the UMTS system, or systems supporting packet-switched services of second-generation mobile communication systems, such as the GPRS system. The invention can also be applied to wired terminals and network elements supporting them.

Figure 1:
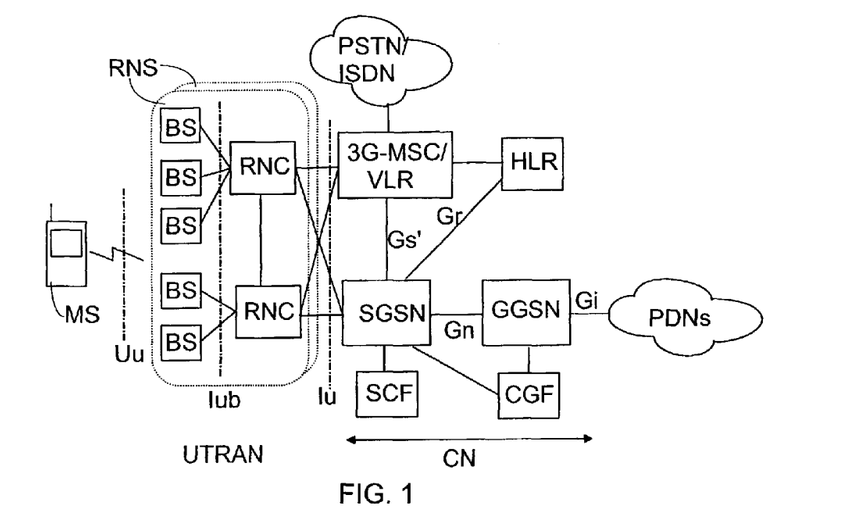

Reference is made to FIG. 1, where the main parts of the mobile communication system are a core network CN and a terrestrial radio network UTRAN of the UMTS mobile communication system (UMTS Terrestrial Radio Access Network), which form the fixed network of the mobile communication system, as well as a mobile station MS, which is also called user equipment UE. The interface between the CN and the UTRAN is called Iu, the air interface between the UTRAN and the MS being called Uu.

UTRAN is typically formed of several radio network sub-systems RNS, the interface between which is called Iur (not shown). The RNS is formed of a radio network controller RNC and one or more base stations BS, of which also the term 'node B' is used. The interface between the RNC and the BS is called Iub. The base station BS attends to the implementation of the radio path, and the radio network controller RNC controls radio resources. Also the GSM radio sub-network can be used to provide access to the UMTS core network CN.

The core network CN is formed of an infrastructure which is part of the mobile communication system and outside the UTRAN. In the core network, a mobile switching centre/visitor location register 3G-MSC/VLR attends to circuit-switched calls and is in connection with the home location register HLR. The connection to the serving GPRS support node SGSN of the packet radio system is set up via the interface Gs', the connection to a public switched telephone network PSTN/ISDN being set up via a gateway MSC, GMSC (not shown). The connections of both the mobile switching centre 3G-MSC/VLR and the serving GPRS support node SGSN to the radio network UTRAN (UMTS Terrestrial Radio Access Network) takes place via the interface Iu.

The UMTS system thus also comprises a packet radio system which is implemented to a great extent in accordance with the GPRS system connected to a GSM network, which also explains why the names of the network elements have references to the GPRS system. The packet radio system of the UMTS can comprise several gateway GPRS support nodes and serving GPRS support nodes, and typically, several serving GPRS support nodes SGSN are connected to one gateway GPRS support node GGSN. The task of the serving GPRS support node is to detect the mobile stations capable of packet radio connections in its service area, to transmit and receive data packets from such mobile stations and to follow the location of the mobile stations in its service area. Further, the service GPRS support node SGSN is in connection with the home location register HLR via the interface Gr. The home location register HLR also contains records relating to packet radio services, which records comprise the contents of subscriber-specific packet data protocols.

The gateway GPRS support node GGSN operates as the gateway between the packet radio system of the UMTS network and the external packet data network PDN. External data networks can include for instance the UMTS and GPRS network of another network operator, the Internet or a private local area network. The gateway GPRS support node GGSN is in connection with the data networks in question via the interface Gi. The data packets to be transmitted between the gateway GPRS support node GGSN and the serving GPRS support node SGSN are always encapsulated in accordance with the gateway tunnelling protocol GTP. The gateway GPRS support node GGSN also contains the addresses of the PDP (Packet Data Protocol) contexts activated for the mobile stations and the routing information, i.e. for instance the SGSN addresses. The routing information is thus used to link data packets between the external data network and the serving GPRS support node SGSN. The network between the gateway GPRS support node GGSN and the serving GPRS support node SGSN is a network utilizing the IP protocol. The packet data system also comprises several other functions, of which FIG. 1 shows the control function SCF of intelligent network services, preferably the CAMEL services, and the charging gateway CGF responsible for charging.

Figure 2:
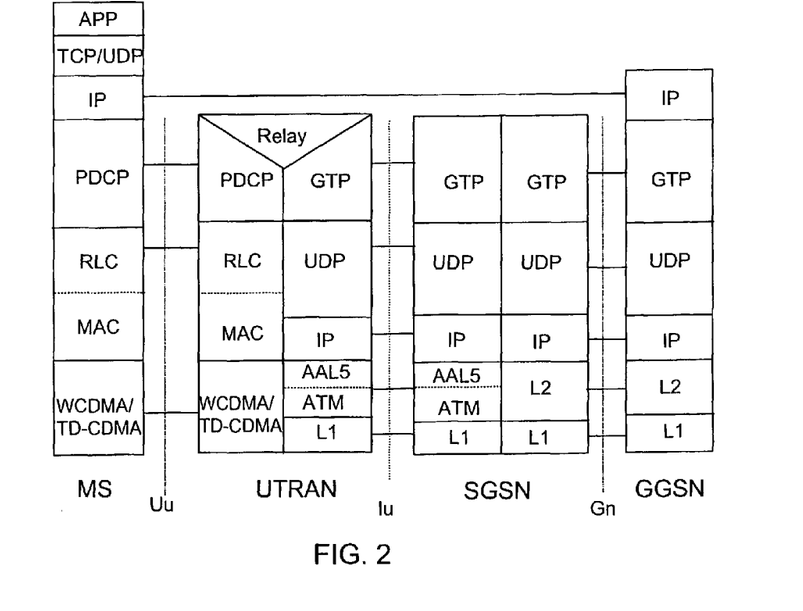
FIG. 2 shows protocol architecture of the UMTS user level.

The architecture of the UMTS packet data protocol is divided into a user plane and a control plane. The control plane contains the UMTS-specific signalling protocols. FIG. 2 illustrates the user plane, which provides user data in protocol data units (PDU) between the mobile station and the GGSN. On the interface Uu between the radio network UTRAN and mobile station MS, the lower-level data transmission on the physical layer L1 takes place in accordance with the WCDMA or TD-CDMA protocol. The MAC layer upon the physical layer transmits data packets between the physical layer and the RLC (Radio Link Control) layer, and the RLC is responsible for the control of radio links of different logical connections. The functionalities of the RLC comprise for example segmentation of the data to be transmitted into one or more RLC data packets. The address fields in the PDCP layer data packets (PDCP-PDU) upon the RLC can possibly be compressed. The data packets are segmented and then transmitted in RLC frames, to which address and checking information relevant for the data transmission has been added. The RLC layer provides the PDCP layer with the possibility to determine the quality of service (QoS) and attends to the retransmission of corrupted frames in the acknowledging transmission mode (the other transmission modes are transparent transmission and non-acknowledging transmission), in other words it performs error correction. PDCP, RLC and MAC form a data link layer. The serving GPRS support node SGSN is responsible for the routing of the data packets arriving from the mobile station MS through the radio network RAN further to the correct gateway GPRS support node GGSN. This connection utilizes the tunnelling protocol GTP, which encapsulates and tunnels all user data and signalling transmitted through the frame network. The GTP protocol is run upon the IP used by the frame network. The IP protocol is used in a UMTS network for two different purposes. The upper IP layer is what is called an application layer IP, which is used between the MS and the GGSN and for the peer device in an external IP network. TCP or UDP protocols, which are utilized by applications APP, can be used on top of the upper IP layer. It is to be noted that the applications APP and the upper IP stack can be located in separate terminal equipment (TE), in which case the separate mobile station terminal MT operates as the communication device to the UMTS network. An example of such a wireless terminal is the combination of a portable computer and a UMTS card phone.

In order to provide packet-switched services, the mobile station MS must perform an attaching procedure in which the position of the MS is made known in the serving GPRS support node SGSN. After this, the MS can receive short messages and calls from the serving GPRS support node SGSN. In order to receive and transmit packet-switched data, the MS must activate at least one PDP context which makes the MS known in the gateway GPRS support node GGSN and forms a logical data transmission context in the mobile station MS, in the serving GPRS support node SGSN and in the gateway GPRS support node GGSN. In the establishment stage of the PDP context, a PDP address, which can be an IPv4 or an IPv6 address (when the PDP type is IP), is determined for the MS. The PDP address is determined in addition to other PDP context information, such as the negotiated QoS profile, for the context table maintained by the gateway GPRS support node GGSN.

Figure 3:
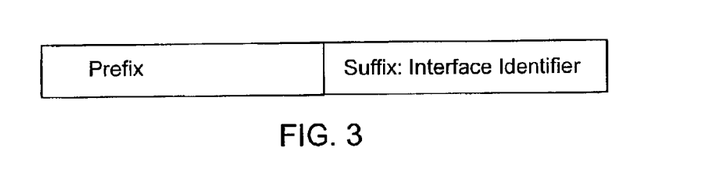
FIG. 3 shows the structure of an IPv6 address.

As can be seen from FIG. 3, the IPv6 address comprises a 64-bit prefix and a 64-bit suffix comprising an interface identifier. In accordance with a preferred embodiment of the invention, the interface identifier of the suffix is used in the gateway GPRS support node GGSN as a filter for one or more PDP contexts, or as a general filter for the whole mobile station.

Figure 4:
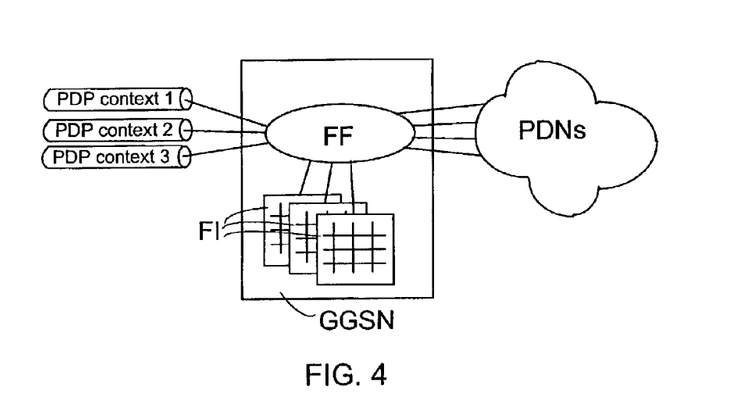
FIG. 4 illustrates a gateway GPRS support node GGSN comprising filter functionality.

As illustrated in FIG. 4, the GGSN comprises a packet filter functionality FF, which attempts to identify a certain flow or a group of flows by including information on possible address fields in the form of packet filter components FI. These packet filters FI can comprise as at least one of their filter parameters an interface identifier that the MS has allocated to itself and indicated to the GGSN. The packet filters FI are typically PDP-context-specific, whereby no other filter parameters are necessarily needed in addition to the interface identifier.

Figure 5:
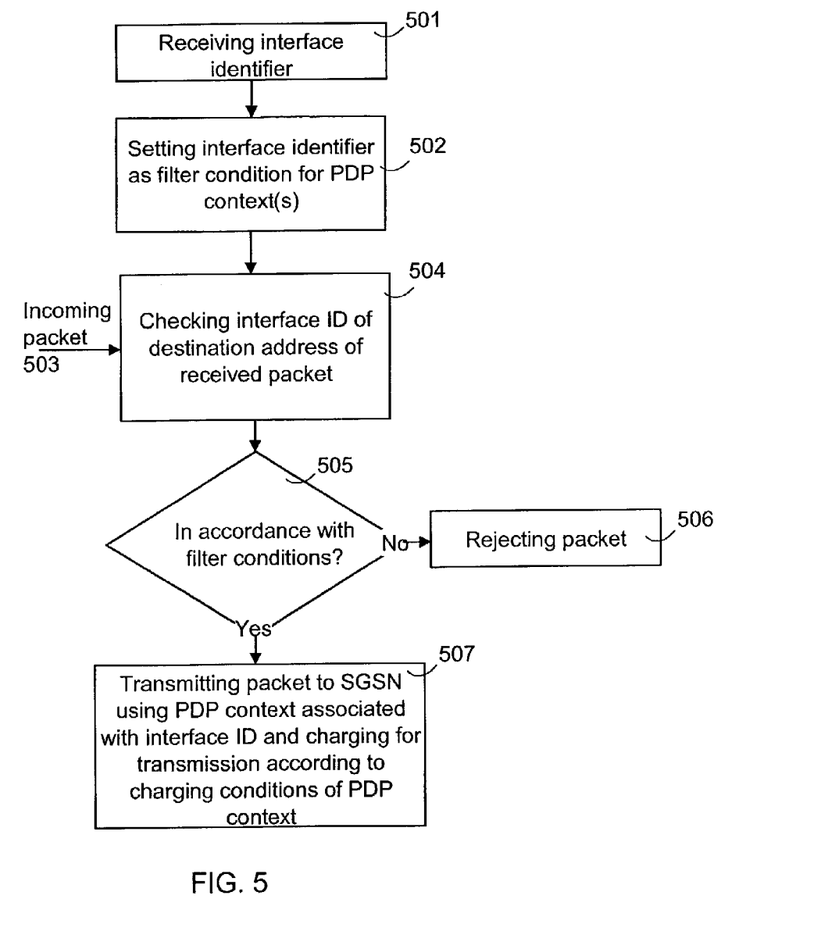
FIG. 5 shows a flow chart of the operation of a gateway GPRS support node according to a preferred embodiment of the invention.

FIG. 5 illustrates the operation of the gateway GPRS support node GGSN. In step 501, the GGSN receives an interface identifier from the mobile station MS. The interface identifier can be received in an activation or modification message of the PDP context (embodiments in FIGS. 6 and 7), or as a separate message or indication attached to a packet transmitted from the mobile station MS and containing user or signalling data (e.g. embodiment in FIG. 8).

The GGSN sets 502 a filter condition from the received interface identifier for one or more PDP contexts. It is to be noted that the PDP context can also have other filter conditions. When a packet 503 is received from an external packet data network, its interface identifier is checked 504, 505. Thus, the GGSN compares the address fields of the packets it has received from an external IP network PDN with the filter information (FI), on the basis of which the GGSN knows whether packets can be further transmitted to the terminal, and if they can be transmitted, which PDP context is to be applied to each particular IP packet. If the interface identifier of a received packet is not in accordance with the filter conditions determined for the PDP context, the packet is not transferred 506 by means of the PDP context. If several PDP contexts can be used for the mobile station MS indicated by the prefix, the filter conditions of all contexts are preferably checked, and if the interface identifier of the packet has not been determined for any particular PDP context, the packet is rejected 506.

The use of the interface identifier as the packet filter improves security, because only certain interface identifiers can be allowed for the mobile station. On the basis of the interface identifier, the GGSN can prevent the transmission of all downlink packets that are outside the selected interface identifier area. When the TCP/UDP fields are encrypted (IP sec), it is also easier and faster for the gateway GPRS support node GGSN to use the interface identifier of the IP address as the filter parameter, compared with using TCP/UDP address fields conventionally used in flow identification.

If the interface identifier of the packet is determined in the filter conditions of the PDP context, the packet is transmitted 507 to the MS by using data transmission parameters determined by the PDP context, for example QoS parameters. In such a case, data flows from an external data network can only be accepted from parties to which an interface identifier has been indicated (with which the application of the MS application layer APP communicates), whereby attacks using random interface identifiers can be avoided.

In accordance with a preferred embodiment, also charging for packets to and/or from the MS is determined on the basis of the interface identifier, at least in such a case where the interface identifier indicates one PDP context to be used, the charging conditions of which are then used 507. The interface identifier can also be used in the collection of charging information if the charging is based on an IP flow. In such a case, data transmitted from different addresses can be charged in different ways even if they are bound to the same prefix. This would offer a possibility for PDP-context-based charging, whereby different secondary PDP contexts could be charged in different ways (for packets transmitted in the downlink and/or uplink direction) if each secondary PDP context were allocated a separate interface identifier. The charging gateway CGF or a separate charging server can thus collect interface-specific charging information from gateway GPRS support nodes GGSN, SGSN, or other network elements with which the mobile station communicates. In this way, charging can be made more varied and more accurate information can be received on the transmission of packets. The charging/billing system may need to compare the charging information received from the application to the charging information from the UMTS system, whereby the interface identifier received from the MS may be used. The interface identifiers informed by the mobile stations MS can be signalled in the UMTS network (or other network) for any network element which would benefit from interface identifier information either in charging or security aspects. One such network element in which the interface identifiers allocated in the MS can be used is the SGSN. For instance, the SGSN may determine the interface identifier from PDP context activation or modification message. According to an embodiment, new interface identifiers are transmitted from the SGSN or GGSN to a server providing presence services and/or push services. Due to this embodiment, the servers providing these services are able to function correctly, i.e. they always have the exact IP address of the corresponding application entity in the MS. According to another embodiment, for CAMEL-services the SGSN may send the interface identifier to the service control function SCF. With the SCF it is possible to provide prepaid packet-switched services, for instance. It is possible to collect information for telemonitoring from the subscribers and the data they send and/or receive. For instance, the SGSN may send information on the IP addresses and the data send therefrom and/or received thereto on subscriber under monitoring. According to one further embodiment, the interface identifier received from the MS is used in authentication services, e.g. in RADIUS (remote authentication dial-in user service) server.

If one interface identifier is used as the filter condition of several PDP contexts, it is possible to select the PDP context used in step 507 on the basis of other filter conditions or to use the primary PDP context having the same interface identifier as the filter condition.

Figure 6:
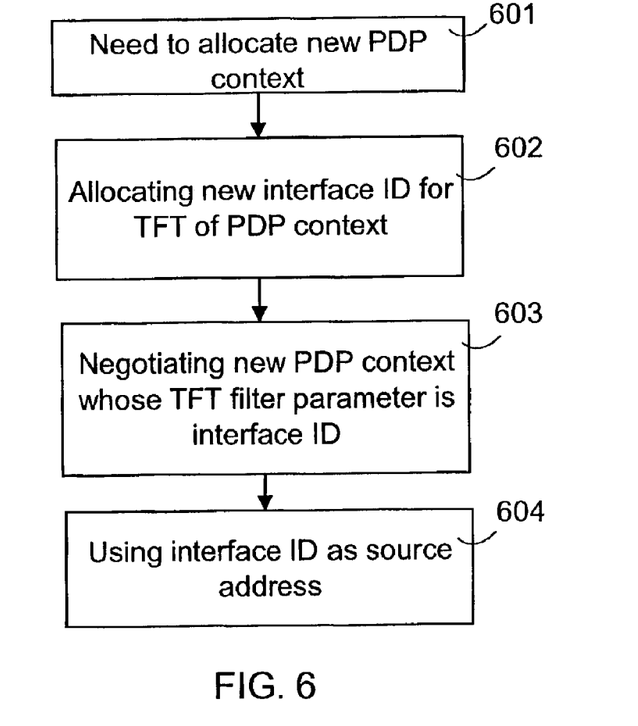
FIG. 6 shows a flow chart of the operation of a mobile station according to a preferred embodiment of the invention.

FIG. 6 illustrates operation of a mobile station according to a preferred embodiment of the invention, the interface identifier being determined in the TFT template determined for PDP contexts. The mobile station is responsible for adding and updating TFT templates. When there is a need 601 to activate a new PDP context or to modify filter conditions of an existing PDP context, the MS allocates 602 a new interface identifier preferably for each new PDP context to be formed. The interface identifier can be a number determined by a random number generator, for example. The need 601 typically arises when a new application is activated but it is still desirable to use the PDP address already allocated to the mobile station (in the case of an IPv6 address a prefix). After this, the MS can form a request message to activate a PDP context, comprising at least a TFT template containing the interface identifier. On the basis of the requirements of the application, the MS determines for the PDP context request the quality of service QoS to be requested and for the TFT template the required filter information. On the basis of the request message, a new PDP context is negotiated 603 between the MS, SGSN and GGSN (or an existing PDP context is modified). At least the interface identifier is determined as the filter parameter of the PDP context TFT template (filter FI) transmitted by the MS in question for the filter functionality FF of the gateway GPRS support node GGSN. When a new PDP context is active, the MS can concatenate an interface identifier for the IPv6 prefix allocated to it and transmit 604 packets of the application plane APP, whereby the MS adds the interface identifier it has allocated as the suffix of the IP source address of the APP packets.

It may be the case that the MS allocates 602 an interface identifier only after it has received the IPv6 prefix allocated by the gateway GPRS support node GGSN. In such a case, the activation of the PDP context is started for the mobile station MS without the PDP address, after which the MS can receive the prefix in the router advertisement transmitted by the GGSN. The GGSN determines for the PDP context the IPv6 prefix that the MS has received from the advertisement as the PDP address of the mobile station. Typically, the GGSN also suggests an interface identifier in the advertisement, and it is possible for the MS to reject it, if desired, and to allocate a new interface identifier. Since the MS can allocate a new interface identifier (for the primary or a secondary PDP context) at any time, the invention can be applied in address allocation solutions deviating from what has been illustrated above.

The interface identifier can thus be used as a new element in the TFT template, whereby the GGSN receives the TFT template in step 501 of FIG. 5, stores it in step 502 and uses it in step 504. In fact, other packet filters are not necessarily needed, because the interface identifier can uniquely identify the IP traffic intended for the secondary PDP context in question.

In published 3GPP specifications, TFT templates are defined to be used only in the activation of secondary PDP contexts. If this is followed, the GGSN can in step 506 (when the interface identifier of the destination IP address of the received packet is not determined as the filter parameter of any secondary PDP context) transmit the packet using the primary PDP context instead of rejecting the packet. If the intention is to avoid completely the security problem mentioned earlier, the mobile station MS can be forced to use the interface identifier suggested by the GGSN in connection with the prefix in data transmitted via the primary PDP context. In such a case, the GGSN would accept no other packets via the PDP context in the downlink direction than those comprising the interface identifier suggested by it. In accordance with a preferred embodiment of the invention, TFT templates are used for any PDP context, in other words also for primary PDP contexts. In such a case, an interface identifier can be determined for instance for all PDP contexts allocated to the PDP address and comprising the prefix of the IPv6 address structure allocated to the MS, whereby all packets whose destination IP address interface identifiers are not determined in some TFT template are rejected (step 506 in FIG. 5). It is also possible to determine several interface identifiers or a certain area of interface addresses as the filter condition. Thus, the MS can freely allocate interface identifiers, which are also updated for primary PDP contexts, and the security risk can be avoided.

Figure 7:
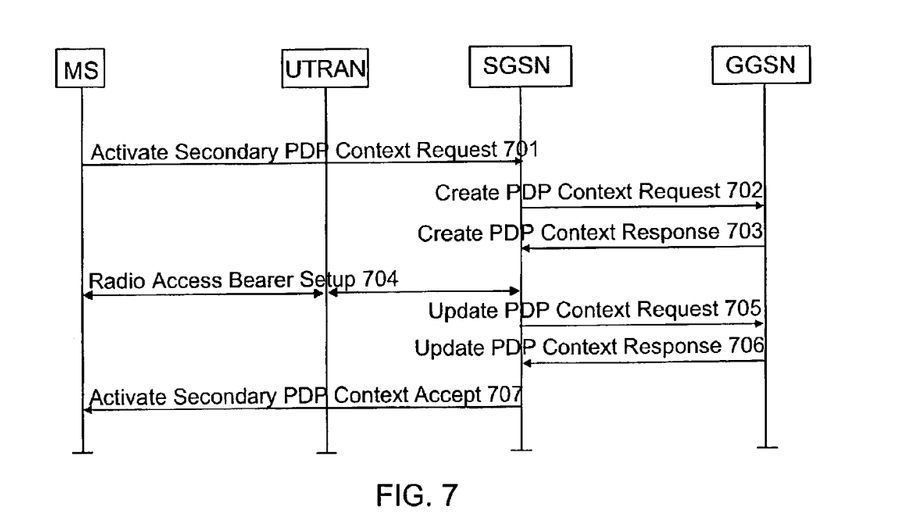
FIG. 7 shows activation of a secondary PDP context.

FIG. 7 illustrates activation of a secondary PDP context in more detail. The mobile station MS transmits 701 an 'activate secondary PDP context' request to the SGSN, the request comprising a tunnel identifier of an activated PDP context, a new tunnel identifier, an NSAPI identifier, the requested QoS profile and a TFT template. The contents of the TFT template is transferred in a particular TFT information element, which can be used to create a new TFT, to remove an existing TFT and to add, remove or replace one or more filters of an existing TFT. The TFT is transmitted transparently through the SGSN. The TFT can comprise at least the following filter parameters:

source IP address (refers to the address of a peer device in an external network PDN), source gate, destination gate, Diff-Serv field (Differentiated Services), flow identifier (IPv6), protocol number (IPv4)/the next address field (IPv6), security parameter index SPI in connection with the IPSec protocol, and according to the present preferred embodiment also an interface ID allocated by one or more mobile stations.

Security functions can be performed after step 701 between the mobile station MS and the serving GPRS support node SGSN. The SGSN transmits a 'create PDP context' request 702 to the gateway GPRS support node GGSN. The SGSN uses the same GGSN address as in a PDP context activated earlier. The GGSN generates a new context for the PDP context table and stores the TFT. After this, the GGSN transmits a response 703 to the SGSN. The SGSN can start set-up of a radio network service, whereby a radio access bearer is set up 704 for the mobile station MS. If the requested QoS attributes cannot be provided on the basis of step 704, the SGSN informs 705 the gateway GPRS support node GGSN, which affirms new QoS attributes in step 706. The SGSN sets a packet flow identifier and radio priority in accordance with the negotiated QoS and responds 707 to the mobile station MS. The mobile station MS updates its context information with a new secondary PDP context. The MS can now send data packets via different GTP tunnels by using different PDP contexts and correspondingly different interface identifiers. TFT templates also provide the advantage that messages already defined in the UMTS specification for activating a PDP context can be used.

Although FIG. 7 illustrates activation of a secondary PDP context, determination of an interface identifier according to a preferred embodiment of the invention from the MS to the gateway GPRS support node GGSN can, as described above, be applied to the activation of primary PDP contexts, and generally in modification stages of active PDP contexts. For a more detailed description relating to activation and modification of PDP contexts, reference is also made to the 3GPP specification 3GPP TS 23.060 V5.0.0 'General Packet Radio Service (GPRS); Service Description; Stage 2; Release 5', January 2002, to Chapter 9, pages 119-140. The information element comprising an interface identifier can well be transferred in other types of messages as well, and for this purpose it is possible to use a new specific interface identifier advertisement.

Figure 8:
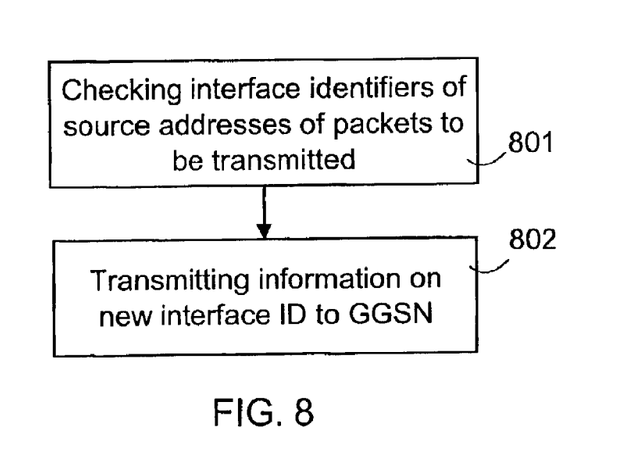
FIG. 8 shows the operation of a mobile station according to a second preferred embodiment of the invention.

FIG. 8 illustrates a method according to a second preferred embodiment, in which the mobile station MS observes 801 the interface identifiers of the source IP addresses of the data packets to be transmitted. When an interface identifier is detected that has not yet been indicated to the gateway GPRS support node GGSN, the MS transmits 802 an interface identifier to the GGSN. The MS preferably maintains a list of the interface identifiers that have been indicated to the GGSN and adds a new interface identifier to it after step 802. It is to be noted that the MS does not necessarily have to observe all packets to be transmitted, but for instance in the activation stage of the application utilizing the IP layer, an interface identifier is selected that the application must use in its packets. The MS can attach an interface identifier to data packets containing user data, from which the GGSN picks it up. The GGSN operates as illustrated in FIG. 5, in other words it maintains interface identifiers allowed for the mobile station MS and gives access to the MS only to packets whose interface identifier corresponds to some interface identifier transmitted by the MS. It is also possible for the MS to transmit at one time a list of interface identifiers that it wishes to use, for example in the activation stage of the PDP context. If the operation of the mobile station MS is divided into two devices, for example into a computer operating as the terminal equipment TE and a UMTS communication device operating as mobile termination MT, the MT can observe the source IP addresses of applications of the TE and packets transmitted by the IP stack, particularly interface identifiers. There is a plurality of alternatives for the implementation: the TE can start using for example an interface identifier it has selected randomly, and the MT observes the interface identifier and informs the TE if the interface identifier is already in use. It is also possible for the TE to request an interface identifier from the MT, which then allocates a vacant interface identifier to the TE, which identifier the TE can use in the source address. The MT then transmits this interface identifier to the GGSN. The MT can, like a router, observe the IP addresses used by the TE, particularly interface identifiers, or the interface identifier used can be separately signalled from the TE to the MT.

When the embodiment of FIG. 8 is used, the MS can indicate, when requesting for the PDP context, that it wishes to modify filter conditions. This can be performed also by using the above-mentioned TFT templates. The GGSN can determine a mobile-station-specific maximum number for the interface identifiers and indicate the number to the mobile station in the acceptance message of the PDP context activation. It is also important for the MS and GGSN to use the same removal strategy, for example to remove the least used or oldest interface identifier when the maximum number of interface identifiers on the list is exceeded. The MS and the GGSN can also negotiate the maximum number. If the mobile station MS has several active PDP contexts, the interface identifiers do not necessarily have to be bound to an individual PDP context, but they can be processed in a mobile-station-specific manner, and the PDP context to be used for the transfer of the packet comprising an allowed interface identifier is selected for instance on the basis of the TFT template.

Deviating from FIG. 8, a method can also be used where the GGSN observes the interface identifiers of the packets it has transmitted in the uplink direction and maintains a list of allowed interface identifiers. This would, however, load the gateway GPRS support node GGSN to a great extent.

By means of preferred embodiments illustrated above, a mobile station can utilize dynamic addresses presented in the IETF specification RCF 3041 without the use of a DHCP server in such a way that the UMTS network elements (at least GGSN) are aware of the interface identifiers (and thus also whole IP addresses) in use in the MS and can use this information in different functions. Since the MS can change its interface identifiers limitlessly, the above-described notification solutions of interface identifiers from the mobile station are important with regard to the correct operation of the network. When interface identifiers are used as filters, attacks using random interface identifiers can be avoided.

The invention can be implemented in a mobile station and network elements (preferably in at least one gateway GPRS support node GGSN) as a computer program to be executed in one or more processors. Also hardware solutions or a combination of software and hardware solutions can be used.

It will be obvious to a person skilled in the art that as the technology advances, the basic idea of the invention can be implemented in a plurality of ways. The invention and its embodiments are thus not limited to the above-described solutions but can vary within the scope of the claims.

The invention claimed is:

1. A method of transmitting packet data from a first subsystem to a terminal device via a network node of a second subsystem, the method comprising:
   receiving a traffic flow template (TFT) from a terminal device at a network node in a request message for activating or modifying a packet data protocol (PDP) context;
   receiving an interface identifier from the terminal device at the network node, the interface identifier associated with the PDP context;

allocating a prefix according to an IP version 6 (IPv6) address structure at the network node when forming a logical data transmission context for the terminal device in the network node, the prefix being used to identify the terminal device;

transmitting the prefix to the terminal device, wherein the IPv6 address of the terminal device comprises the received interface identifier and the prefix according to the IPv6 address structure;

forming a filter to guide mapping of at least one data flow of a first subsystem to at least one data flow of a second subsystem at the network node, said filter comprising the received interface identifier, and wherein the filter is associated with the TFT template of the request message;

receiving a packet from the first subsystem at the network node, the packet including an interface identifier as at least part of a destination internet protocol (IP) address for the packet;

comparing, at the network node, the interface identifier of the packet from the first subsystem to the received interface identifier of the filter;

in response to a successful comparison of the interface identifier of the packet from the first subsystem to the received interface identifier of the filter, mapping the received packet to the at least one data flow of the second subsystem using the destination IP address for the received packet and the filter; and transmitting the received packet to the terminal device using the mapped data flow.

2. A method according to claim 1, wherein the packet received in the network node is not transmitted to the terminal device as a response to an interface identifier of the destination IP address of said packet or part of it not being defined for any filter determined for the terminal device.

3. A method according to claim 1, the method further comprising:

charging for packets transmitted to the terminal device or for packets transmitted from the terminal device on the basis of the interface identifier received from the terminal device.

4. A network element for supporting a packet-switched data transmission from a first subsystem to a second subsystem, the network element comprising:

an interface configured to:
receive a traffic flow template (TFT) from a terminal device in a request message for activating or modifying a packet data protocol (PDP) context;
receive an interface identifier from the terminal device, the interface identifier associated with the PDP context;

a processor configured to allocate a prefix according to an IP version 6 (IPv6) address structure when forming a logical data transmission context for the terminal device, the prefix being used to identify the terminal device;

wherein the processor is further configured to transmit the allocated prefix to the terminal device wherein the IPv6 address of the terminal device comprises the received interface identifier and the allocated prefix according to the IPv6 address structure;

a filter configured to guide mapping of a first data flow of a first subsystem to a second data flow of a second subsystem, the filter comprising the received interface identifier associated with the second data flow, and wherein the filter is associated with the TFT template of the request message;

wherein the interface is configured to receive a packet from the first subsystem, the packet including an interface identifier as at least part of a destination internet protocol (IP) address for the packet;

wherein the processor is further configured to:
compare the interface identifier of the packet from the first subsystem to the received interface identifier of the filter; and
in response to a successful comparison of the interface identifier of the packet from the first subsystem to the received interface identifier of the filter, map the received packet to the second data flow of the second subsystem using the destination IP address for the received packet and the filter; and
transmit the received packet to the terminal device using the mapped data flow.

5. The network element of claim 4, wherein the received packet is not transmitted to the terminal device if the received packet is not mapped to a data flow of the formed filter.

6. A non-transitory computer-readable storage medium having instructions stored thereon, the instructions comprising:

instructions for receiving a traffic flow template (TFT) from a terminal device at a network node in a request message for activating or modifying a packet data protocol (PDP) context;

instructions for receiving an interface identifier from the terminal device at the network node, the interface identifier associated with the PDP context;

instructions for allocating a prefix according to an IP version 6 (IPv6) address structure when forming a logical data transmission context for the terminal device, the prefix being used to identify the terminal device;

instructions for transmitting the prefix to the terminal device, wherein the IPv6 address of the terminal device comprises the received interface identifier and the prefix according to the IPv6 address structure;

instructions for forming a filter to guide mapping of at least one data flow of a first subsystem to at least one data flow of a second subsystem, said filter comprising the received interface identifier, and wherein the filter is associated with the TFT template of the request message;

instructions for receiving a packet from the first subsystem, the packet including an interface identifier as at least part of a destination internet protocol (IP) address for the packet;

instructions for comparing the interface identifier of the packet from the first subsystem to interface identifiers of the filter;

instructions for, in response to a successful comparison of the interface identifier of the packet from the first subsystem to at least one interface identifier of the filter, mapping the received packet to the at least one data flow of the second subsystem using the destination IP address for the received packet and the formed at least one filter; and instructions for transmitting the received packet to the terminal device using the mapped data flow.

* * * * *